Feb. 26, 1957    A. SALZER    2,783,022
OCEAN WAVE POWER DEVICE
Filed March 30, 1954    3 Sheets-Sheet 1
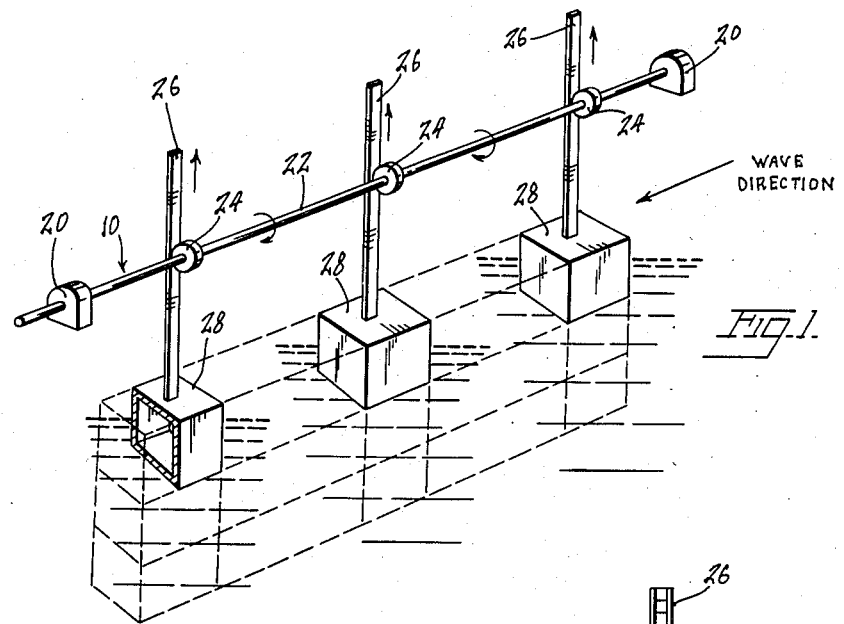
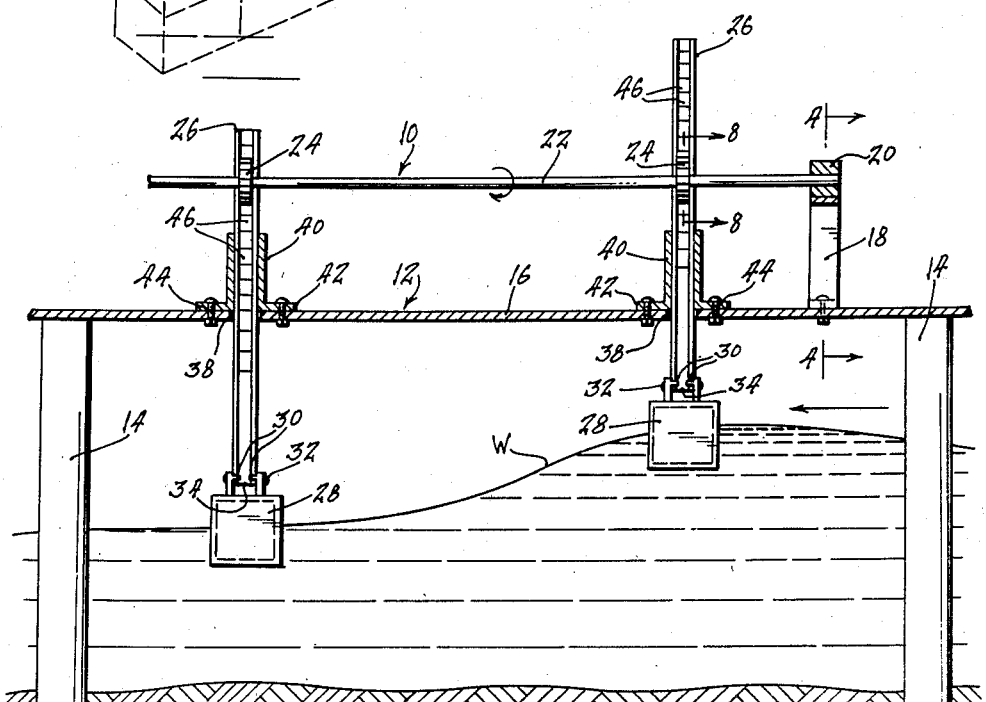
INVENTOR.
ALEXANDER SALZER
BY
ATTORNEY Feb. 26, 1957 A. SALZER 2,783,022
OCEAN WAVE POWER DEVICE
Filed March 30, 1954 3 Sheets-Sheet 2

INVENTOR.
ALEXANDER SALZER
BY
ATTORNEY

Feb. 26, 1957 A. SALZER 2,783,022
OCEAN WAVE POWER DEVICE
Filed March 30, 1954 3 Sheets-Sheet 3

INVENTOR.
ALEXANDER SALZER
BY
ATTORNEY

United States Patent Office 2,783,022
Patented Feb. 26, 1957

2,783,022

OCEAN WAVE POWER DEVICE

Alexander Salzer, New York, N. Y.

Application March 30, 1954, Serial No. 419,690

4 Claims. (Cl. 253—10)

This invention relates to that class of devices known generally as wave motors. More particularly, the invention has reference to a wave operated power device wherein, by reason of an improved arrangement, the passage of ocean waves under a structure on which the device is mounted will be adapted to actuate a novelly designed and arranged assembly of parts, in such a manner as to produce unidirectional rotation of a power transmitting shaft which can extend to a generator, turbine, or other conversion device.

One important object of the present invention is to provide apparatus of the type referred to which will be characterized by the simplicity of its construction, thereby to produce power at a relatively low outlay of expense.

Another object of importance is to provide, in a wave motor or power device of the nature described, a shaft rotating means which can be assembled in multiple, thus to permit a single wave to move under the plurality of the shaft rotating devices in succession with each device being actuated by the wave passing thereunder to impart rotatable movement to the shaft.

Still another object of importance is to provide, in a wave motor, novelly designed rack-and-pinion means wherein the rack will be so formed as to have incorporated therein a plurality of individually pivoted pawls novelly gravitating to a pinion-engaging position, said pawls being adapted to rotate the pinion only when the rack is moved in one direction, the pawls ratcheting over the pinion when the rack is moved in an opposite direction.

Yet another object is to provide, in one form of the invention, a multiplicity of rack-and-pinion devices so arranged as to cause one rack to rotate its associated pinion in a particular direction on upward movement of the rack responsive to passage of a wave thereunder, a second rack being arranged to rotate its pinion in the same direction as the first pinion, but only on downward movement of the second-named rack responsive to ebbing of the water thereunder.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a diagrammatic representation in perspective, in which part has been broken away, of an ocean wave power device form in accordance with the present invention.

Fig. 2 is a longitudinal sectional view through a power device formed in accordance with the invention, and through a pier on which said device is mounted.

Figure 3:
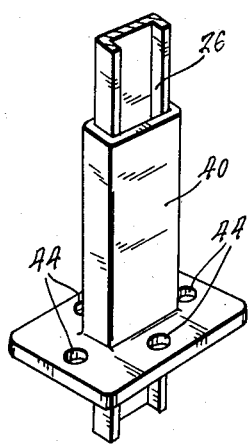
Fig. 3 is a fragmentary perspective view showing the means for guiding one of the racks in its vertical movement.

The reference numeral 10 has been applied generally to the ocean wave power device constituting the present invention, said device being illustrated in Fig. 2 in proper position on a pier structure 12, under which pass the waves W of the ocean.

Figure 4:
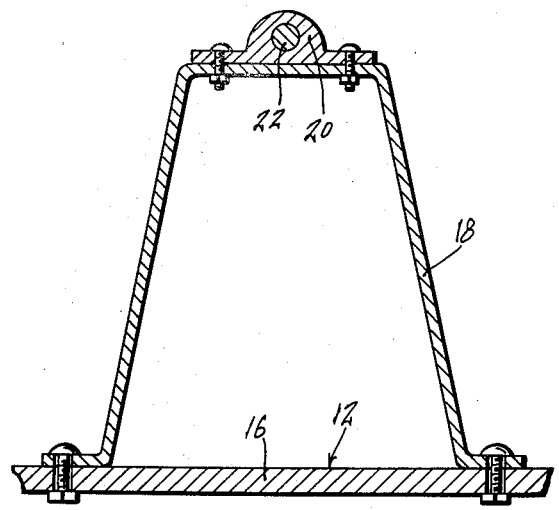
Fig. 4 is an enlarged transverse sectional view taken on line 4—4 of Fig. 2, showing one of the bearings for the driven shaft.

The pier 12 is illustrated somewhat diagrammatically in Fig. 2, and is shown as including a plurality of piles 14 supporting a deck 16. On the deck or platform 16 of the pier, there are mounted spaced bearing support brackets 18 (Fig. 4), these having outwardly extended feet at their lower ends bolted to the deck 16. The brackets 18 are of inverted U-shape, and have horizontally disposed bights at their upper ends on which are mounted bearings 20, said bearings being bolted to the brackets and supporting for rotation an elongated shaft 22. Shaft 22 has been only fragmentarily illustrated in the several figures of the drawing, but would extend, as will be understood, to any location at which the power is to be used. Thus, the shaft might extend to a turbine or generator, not shown, for the purpose of converting rotatable movement of the shaft into electrical energy.

In any event, shaft 22 is provided, at locations spaced along its length, with toothed pinions 24, these being keyed to the shaft or otherwise fixed thereto so as to rotate with the shaft. Each pinion has associated therewith a vertically disposed rack 26, and on vertical movement of the rack, in one direction, the pinion associated therewith will be rotated. Thus, in a form of the invention shown in Figs. 1-10, all the racks are arranged to rotate their pinions only when the racks move upwardly in the direction of the arrows shown in Fig. 1. As a result, the pinions will be rotated in a clockwise direction in Fig. 1, to correspondingly rotate the shaft 22 as shown by the arrow in this figure of the drawing. When the racks 26 move downwardly, no rotary movement is imparted to the pinions thereby in the form of the invention shown in Figs. 1-10.

At their lower ends, the racks 26 are connected to floats 28. In the illustrated example, these are formed as hollow, rectangular members, but it will be understood that they could be otherwise shaped so far as their external configuration is concerned. Further, the floats or buoys 28 could, instead of being made hollow, be solidly formed from any suitable buoyant substance such as cork.

Figure 6:
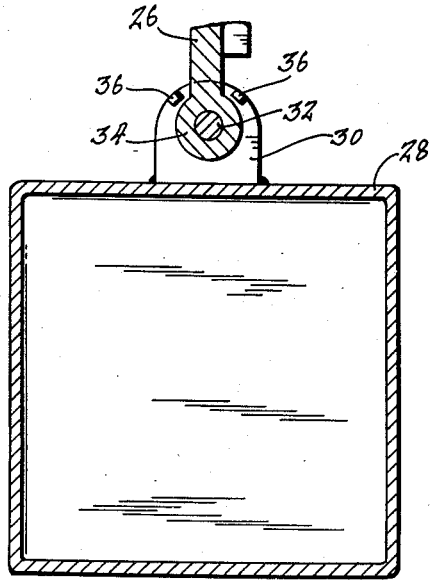
Fig. 6 is an enlarged sectional view taken substantially on line 6—6 of Fig. 5.
Figure 5:
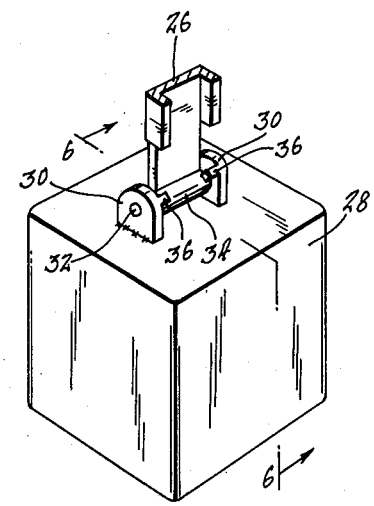
Fig. 5 is a fragmentary perspective view showing the float means at the lower end of each rack.
Figure 7:
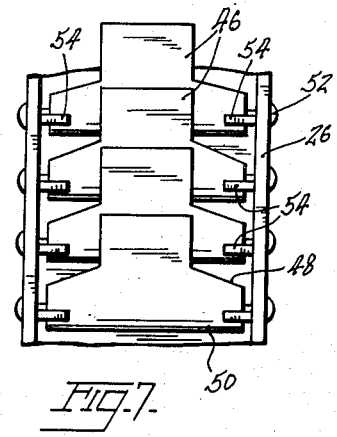
Fig. 7 is a fragmentary front elevational view of one of the racks, on an enlarged scale.

Referring to Figs. 5 and 6, each float 28, at its upper end, is provided with spaced, upstanding ears 30, said ears having aligned openings receiving the opposite ends of a hinge pin 32 passing through a sleeve 34 formed upon the lower end of the associated rack 26. Rack 26, for substantially its full length, is of channeled formation, for a purpose to be made presently apparent.

Each ear 30, at its upper end, is provided with spaced stop lugs 36 (Fig. 6), said stop lugs being disposed at opposite sides of the lower end portion of the rack 26, for the purpose of limiting swinging movement of the float 28 about the axis of the hinge pin 32, relative to rack 26. A certain amount of swinging movement is, however, permitted the float, to take up excessive strains exposed thereupon by waves W passing under the pier.

Above the floats 28, the racks are extended through openings 38 formed in deck 16, said openings being aligned with upstanding, tubular guides 40 mounted upon the deck. Guides 40 are formed as particularly well shown in Fig. 3, with elongated, vertically disposed body portions of rectangular cross section in which the rack 26 is freely slidable in a vertical direction. At their lower ends, the guides each include a horizontally disposed base flange 42 peripherally apertured as at 44 to receive bolts whereby the guides are fixedly connected to the deck.

It is desired that there be a minimum of friction between the racks 26 and their associated guides, during the vertical movement of the racks, and it will be understood that in practice, it may be desirable to equip the guides internally with roller bearings engaging the racks 26 to space the racks away from the walls of the guides. In this way, friction would be reduced to a minimum, during the up and down movement of the racks. It has not been deemed necessary to show such anti-friction means in the illustrated embodiment, since the showing is to a great extent diagrammatic, and is not intended to represent the exact structural embodiment of the commercially produced apparatus.

Referring now to Figs. 7–10, there has here been shown the detailed construction of each rack 26. As will be noted, above the guides 40, each rack is formed with a longitudinal series of pivoted pawls 46 each of which is formed as a tongue element of flat bar material having a beveled outer end, said tongue element merging at its lower end into a widened base 48 which in turn merges into a hinge sleeve 50 rotatably mounted upon a transversely extending hinge pin 52 the ends of which are engaged in the opposite side walls of the channeled rack. Said side walls are provided, at uniformly spaced intervals along their lengths, with inwardly facing lugs 54, the lugs being arranged in transversely aligned pairs with each pair being adapted to engage the opposite side edges of the widened base 48 of a pawl to limit swinging movement of said pawl outwardly from the web of the rack, that is, in a clockwise direction when the pawls are viewed as in Figs. 8 and 9.

When the pawls are engaged by the stop lugs 54, they project outwardly in oblique relationship to the length of the rack. In this position, each pawl is adapted to engage a tooth 56 of the associated pinion 54, during upward movement of the rack in a direction shown by the arrow in Fig. 8. In other words, as the rack moves upwardly, each pawl will engage one edge 58 of a tooth 56, to impart rotary movement to the pinion in the direction shown by the arrow in Fig. 8. It will be noted that in a preferred embodiment, each tooth has one edge 58 extending radially of the axis of rotation of the pinion, the other edge 60 of the same tooth being disposed at an acute angle to said edge 58. Each tooth, thus, is of right triangular shape.

When a wave W passes under the pier, it will pass successively the several rack and pinion assemblies of the device. This will be noted by reference to Figs. 1 and 2, wherein it is seen that the shaft 22 extends transversely to the waves, that is, in alignment with the direction of movement of the waves. Therefore, a single wave will first pass under that rack and pinion assembly disposed at the outermost end of the device, as shown in Fig. 2. After passing this particular rack and pinion assembly, the wave will pass under successively following assemblies, until it passes the assembly disposed closest to the shore.

Figure 8:
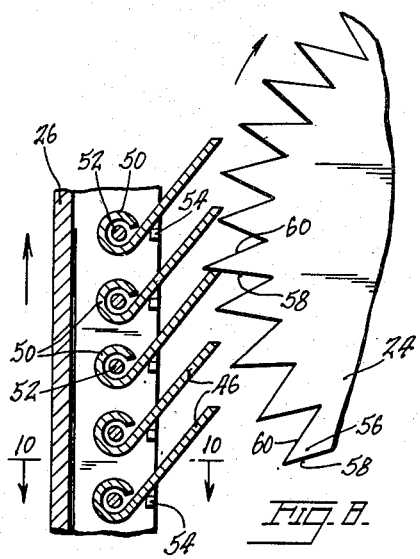
Fig. 8 is a detail sectional view, on an enlarged scale, taken substantially on line 8—8 of Fig. 2.
Figure 9:
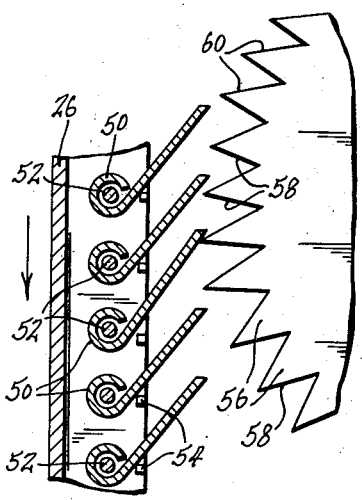
Fig. 9 is a view similar to Fig. 8 in which the rack is shown as it appears when descending.

As the wave passes under each assembly, it floats the buoy 28 of said assembly upwardly, to impart upward vertical movement to the rack of the assembly, thereby rotating the pinion 24 in a clockwise direction, viewing the pinion as it appears in Figs. 1 or 8. It will be observed that substantially continuous rotary movement will be given to the shaft 22, because each rack will begin moving upwardly before or at the termination of the upward movement of the rack next preceding the same. Of course, as each rack moves downwardly after passage of the wave thereunder and ebbing of the water below the assembly, each pawl 46 will be swung in a counterclockwise direction, viewing the pawls as in Fig. 9, and will not act to rotate pinion 24. This is shown in Fig. 9, wherein one of the pawls is illustrated as it appears when swung inwardly toward the web of the rack 26. In other words, a ratcheting action occurs during downward movement of the rack relative to its associated pinion.

Figure 11:
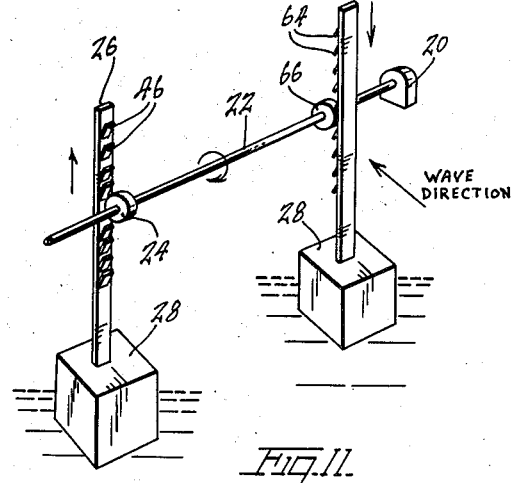
Fig. 11 is a view similar to Fig. 1 showing a modified form.
Figure 10:
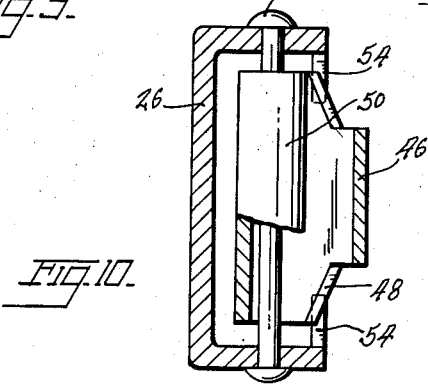
Fig. 10 is a sectional view on line 10—10 of Fig. 8.

In Fig. 11 there is shown a modified arrangement, wherein rotary motion is imparted to the shaft 22 in a constant direction not only by upward movement of a rack, but also by downward movement of another rack. In this arrangement, one rack, shown at the left in Fig. 11, is identical to those previously described, that is, the pawls 46 extend upwardly and outwardly from their hinge connections in the manner shown in Fig. 8. Therefore, the rack at the left in Fig. 11 would rotate shaft 22 in a clockwise direction when the float 28 of said rack moves upwardly responsive to passage of a swell therebelow.

The rack shown at the right in Fig. 11 has been designated by the reference numeral 62, and is of a modified construction, having pawls 64 that face downwardly rather than upwardly. Pawls 64 can be spring pressed outwardly to their normal, pinion-engaging positions, and it will be observed that during downward movement of rack 62, a pinion 66 associated therewith will be rotated in a clockwise direction.

When rack 62 moves upwardly, it ratchets over pinion 66, and does not impart rotary motion thereto.

The arrangement shown in Fig. 11 can be used to advantage with the shaft 22 disposed broadside to the direction of movement of the waves. In other words, when a wave passes under the device, both floats will move upwardly, rack 26 at the left in Fig. 11 engaging pinion 24 to rotate the same. As the water ebbs beneath the structure, and the racks move downwardly, rack 62 will take up the task of rotating shaft 22, and will impart rotary motion to pinoin 66. A substantially continuous rotation of shaft 22 is thus assured, as long as there is ebbing and swelling of the ocean waters beneath the power device.

The form of the invention shown in Fig. 11 could, of course, be arranged in the same position as the first form, that is, with the shaft 22 disposed in alignment with the direction of movement of the waves.

It is to be understood that this power device may be used at brooks, rivers also at waterfalls, to generate electric power.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An ocean wave power device comprising a float seated in the water, a pair of vertical ears extending from said float, a deck, a rack housing open at both ends secured to said deck, a rack secured to said vertical ears and extending through said housing and a pinion engaging said rack and adapted to rotate upon motion of said float, said rack housing being tubular and including a base flange to be secured to the deck, said rack being channel shaped and freely slidable in said housing, and including pawl members pivotally mounted along the vertical length thereof, said pawl members each including a pin fixed between the side walls of the rack, and a plate-like member having a sleeve at one end loosely encircling the pin and having a reduced portion at its other end for engaging the pinion.

2. The combination of claim 1, wherein said rack contains laterally extending stop lugs on its side walls to engage the pawls, thereby preventing excess pivoted motion.

3. An ocean wave power device comprising a float seated in the water, a pair of vertical ears extending from said float, a deck, a rack housing open at both ends secured to said deck, a rack secured to said vertical ears and extending through said housing and a pinion engaging said rack and adapted to rotate upon motion of said float, said rack housing being tubular and including a base flange to be secured to the deck, said float including a hinge pin between said ears, said rack having a sleeve portion around said pin, and stop means on said ears on opposite sides of said sleeve for engaging said sleeve to limit swinging movement of the float.

4. An ocean wave power device comprising a float seated in the water, a pair of vertical ears extending from said float, a deck, a rack housing open at both ends secured to said deck, a rack secured to said vertical ears and extending through said housing and a pinion engaging said rack and adapted to rotate upon motion of said float, said rack housing being tubular and including a base flange to be secured to the deck, said float including a hinge pin between said ears, said rack having a sleeve portion around said pin, and stop means on said ears engaging said sleeve to limit swinging movement of the float, said rack being channel shaped and freely slidable in said housing and including substantially T-shaped pawl members pivotally mounted along the vertical length thereof.

References Cited in the file of this patent

UNITED STATES PATENTS

| | | |
|---|---|---|
| 681,116 | Grant | Aug. 20, 1901 |
| 986,740 | Mobius | Mar. 14, 1911 |
| 1,454,801 | Webb | May 8, 1923 |

FOREIGN PATENTS

| | | |
|---|---|---|
| 15,775 | Great Britain | 1897 |